US012081804B2

(12) United States Patent
Gisquet et al.

(10) Patent No.: US 12,081,804 B2
(45) Date of Patent: *Sep. 3, 2024

(54) METHOD AND APPARATUS FOR DEBLOCKING FILTERING A BLOCK OF PIXELS

(71) Applicant: CANON KABUSHIKI KAISHA, Tokyo (JP)

(72) Inventors: Christophe Gisquet, Acigne (FR); Jonathan Taquet, Talensac (FR); Patrice Onno, Rennes (FR); Guillaume Laroche, Saint Aubin d'Aubigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,058

(22) Filed: Dec. 2, 2021

(65) Prior Publication Data

US 2022/0094989 A1 Mar. 24, 2022

Related U.S. Application Data

(63) Continuation of application No. 16/650,773, filed as application No. PCT/EP2018/076338 on Sep. 27, 2018, now Pat. No. 11,284,116.

(30) Foreign Application Priority Data

Oct. 9, 2017 (GB) ..................... 1716537
Jun. 28, 2018 (GB) ..................... 1810671

(51) Int. Cl.
*H04N 19/82* (2014.01)
*H04N 19/117* (2014.01)
(Continued)

(52) U.S. Cl.
CPC ........... *H04N 19/82* (2014.11); *H04N 19/117* (2014.11); *H04N 19/14* (2014.11); *H04N 19/176* (2014.11); *H04N 19/182* (2014.11); *H04N 19/86* (2014.11)

(58) Field of Classification Search
None
See application file for complete search history.

(56) References Cited

U.S. PATENT DOCUMENTS 10,575,021 B2 * 2/2020 Norkin ................ H04N 19/119
2014/0192892 A1 7/2014 Van Der Auwera et al.
(Continued)

FOREIGN PATENT DOCUMENTS

| CN | 103491373 A | | 1/2014 | |
|----|-------------|---|--------|---|
| CN | 106911934 A | * | 6/2017 | ............. H04N 19/86 |
| EP | 2775711 A1 | | 9/2014 | |
| JP | 6956858 B2 | | 11/2021 | |

OTHER PUBLICATIONS

Claim Translation of CN 106911934 A1 (Year: 2017).*
(Continued)

*Primary Examiner* — Mohammed Jebari
(74) *Attorney, Agent, or Firm* — Canon U.S.A., Inc. IP Division

(57) ABSTRACT

A method of filtering a block of pixels in an image, comprising obtaining a first clipping control parameter (tc) value based on a quantization parameter of the block; comparing a first value of a first pixel located on one side of an edge in said block and a second value of a second pixel located on the other side of the edge in said block with a predetermined threshold derived from the first clipping control parameter value; and determining whether to apply a strong filtering to the first pixel based on the result of the comparison, wherein: the strong filtering comprises filtering the first pixel value so that the filtered first pixel value differs from the first pixel
(Continued)

value by no more than a range value based on the clipping control parameter (tc), the ration between two range values corresponding to successive values of bitdepths being strictly lower than 2.

6 Claims, 5 Drawing Sheets

(51) Int. Cl.
  *H04N 19/14* (2014.01)
  *H04N 19/176* (2014.01)
  *H04N 19/182* (2014.01)
  *H04N 19/86* (2014.01)

(56) References Cited

U.S. PATENT DOCUMENTS

2015/0010068 A1   1/2015   Francois et al.
2015/0208096 A1   7/2015   Norkin

OTHER PUBLICATIONS

Wenjing Zhu, Template-based palette prediction, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, Doc. No: JCTVC-N0169.
Shen Gao-Feng, et al., Five-Stage Pipeline Hardware Architecture Design for Deblocking Filter in HEVC, Microelectronics & Computer, vol. 33, No. 10, Oct. 2016.

* cited by examiner

METHOD AND APPARATUS FOR DEBLOCKING FILTERING A BLOCK OF PIXELS

CROSS REFERENCE TO RELATED APPLICATIONS

This application is a continuation of U.S. patent application Ser. No. 16/650,773, filed on Mar. 25, 2020, now issued as U.S. Pat. No. 11,284,116 on Mar. 22, 2022, which is a National Phase application of PCT Application No. PCT/EP2018/076338, filed on Sep. 27, 2018, which claims the benefit under 35 U.S.C. § 119(a)-(d) of United Kingdom Patent Application No. 1716537.4, filed on Oct. 9, 2017 and entitled "METHOD AND APPARATUS FOR DEBLOCKING FILTERING A BLOCK OF PIXELS" and of United Kingdom Patent Application No. 1810671.6, filed on Jun. 28, 2018 and entitled "METHOD AND APPARATUS FOR DEBLOCKING FILTERING A BLOCK OF PIXELS". The above cited patent applications are incorporated herein by reference in their entirety.

FIELD OF THE INVENTION

The present disclosure concerns a method and a device for deblocking a reconstructed image in the context of image encoding or decoding. It concerns more particularly the control parameters used in the deblocking in-loop filtering.

BACKGROUND OF INVENTION

FIG. 1 illustrates a block diagram of a decoder 100, which may be used to receive data from an encoder according to an embodiment of the invention. The decoder is represented by connected modules, each module being adapted to implement, for example in the form of programming instructions to be executed by a CPU (not represented here), a corresponding step of a method implemented by the decoder 100.

The decoder 100 receives a bitstream 101 comprising encoded coding units, each one being composed of a header containing information on coding parameters and a body containing the encoded video data. Said encoded video data is entropy encoded, and the motion vector predictors' indexes are encoded, for a given block, on a predetermined number of bits. The received encoded video data is entropy decoded by module 102. The residual data are then dequantized by module 103 and then a reverse transform is applied by module 104 to obtain pixel values.

It should be clarified at this point that transform unit or transform block and coding unit or coding block are loosely interchangeable, and similarly when the block relates to samples of pixels. In the above, the residual data is made of the differences between reference samples and prediction samples, said samples belonging to one component. By extension, a transform block or unit is usually associated to samples, whereas a coding block or unit can refer to either samples, or pixels. Indeed, a pixel has several components, e.g. Y, U and V. In all cases, processing a block of pixels consists in applying a predetermined process to each corresponding block of samples.

The mode data indicating the coding mode are also entropy decoded, and based on the mode, an INTRA type decoding or an INTER type decoding is performed on the encoded blocks of image data.

In the case of INTRA mode, an INTRA predictor is determined by intra reverse prediction module 105 based on the intra prediction mode specified in the bitstream.

If the mode is INTER, the motion prediction information is extracted from the bitstream to find the reference area used by the encoder. The motion prediction information is composed of the reference frame index and the motion vector residual. The motion vector predictor is added to the motion vector residual in order to obtain the motion vector by motion vector decoding module 110.

Motion vector decoding module 110 applies motion vector decoding for each current block encoded by motion prediction. Once an index of the motion vector predictor, for the current block has been obtained the actual value of the motion vector associated with the current block can be decoded and used to apply reverse motion compensation by module 106. The reference image portion indicated by the decoded motion vector is extracted from a reference image 108 to apply the reverse motion compensation 106. The motion vector field data 111 is updated with the decoded motion vector in order to be used for the inverse prediction of subsequent decoded motion vectors.

Finally, a decoded block is obtained. Post filtering is applied by post filtering module 107. Among the various possible known post filtering techniques, HEVC, for instance, employs two tools known respectively as "Sample Adaptive Offset" and as "Deblocking Filter", the later being of interest here and described in the following. A decoded video signal 109 is finally provided by the decoder 100.

It should be noted that usually, some modules are also present in the encoder, such as post-filtering module 107, or dequantization module 103 or reverse transform module 104. During decoding, the decoding of a coding unit is generally based on previously decoded content for prediction. The decoded do not have access to original non-coded coding units. This means that the encoder needs to have access to the decoded version of these coding units. Consequently, after encoding a coding unit, the encoder proceeds to its decoding to store the decoded version of the coding unit to be used for the encoding of the next coding units. In summary, the encoder comprises a decoder and its corresponding modules.

The goal of a deblocking filter is to reduce blocking artefacts usually due to transform coding. As transform coefficients are quantized on a block basis, imperfect reconstruction occurs on steps 103 and 104 of FIG. 1. This leads to discontinuities at the boundaries of transform and/or prediction blocks, and is considered as one of the most distracting artefacts, besides reducing coding efficiency.

In HEVC, as well as its candidate successor currently under study under the name JVET, that deblocking filter is made of three mains steps.

In a first step, a filtering type determination occurs at a vertical or horizontal boundary between two blocks, usually based on whether one of the sides of the boundary is INTRA coded, or motion discontinuity on this boundary.

In a second step, gradients are compared to thresholds, to determine whether to filter a set of pixels, and to select the filter to use.

In a third step, once a filter has been selected, actual filtering of said pixels is performed, usually through linear combinations of their values, and restrictions of the range of the linear combination result around said value.

In order to control the deblocking filter process, a set of control parameters are defined and used in the process. These control parameters comprise the boundary strength (bs), a control parameter $\beta$ and a clipping control parameter tc.

In particular, the clipping control parameter tc is used in one of the conditions to determine between a strong and a weak deblocking filter for luminance component. It is also used in conditions to determine if a filtering is to be done or not, and in the computation of the bounds to the range clipping of the filtering operation.

It appears that, especially when using images with bit-depth greater than 8, the definition of the clipping control parameter tc appears to be too coarse and leading to too large range in clipping the filtering.

SUMMARY OF THE INVENTION

The present invention has been devised to address one or more of the foregoing concerns. It concerns a deblocking filtering method with an improved definition of the clipping control parameter tc and/or an improved use of the clipping control parameter tc.

According to a first aspect of the invention there is provided a method, by a video decoder or encoder, of filtering a block of pixels in an image decoded from a bitstream, comprising:

obtaining a first clipping control parameter (tc) value based on a quantization parameter of the block and a bitdepth of the pixel values;

comparing the difference between a first value of a first pixel located on one side of an edge of said block and a second value of a second pixel located on the other side of the edge with a predetermined threshold derived from the first clipping control parameter value; and determining whether to apply a strong filtering to the first pixel based on the result of the comparison, wherein:

the strong filtering comprises filtering the first pixel value so that the filtered first pixel value differs from the first pixel value by no more than a range value based on the first clipping control parameter (tc), the ratio between two range values corresponding to successive values of bitdepths being strictly lower than 2.

According to an embodiment, the strong filtering comprises filtering the first pixel value so that the filtered first pixel value differs from the first pixel value by no more than a second parameter value that is strictly less than two times the first clipping control parameter value.

According to an embodiment, both the first pixel and the second pixel are adjacent to said edge in said block.

According to an embodiment, if the difference between the first value and the second value is equal to or greater than the predetermined threshold, applying a weak filtering to the first pixel so that a filtering difference between the filtered first pixel value and the first pixel value is equal to or less than a half of the first clipping control parameter value.

According to an embodiment, when the first clipping control parameter value is tc, the predetermined threshold is $(5*tc+1)>>1$, and the second parameter value is $tc/n$, wherein n is an integer greater or equal to 2.

According to an embodiment, the strong filtering comprises filtering the first pixel value so that the filtered first pixel value differs from the first pixel value by no more than a second parameter value that is equal or less than the first clipping control parameter value.

According to an embodiment, the weak filtering comprises filtering the first pixel value so that the filtered first pixel value differs from the first pixel value by no more than a second parameter value that is strictly less than the first clipping control parameter value.

According to an embodiment, the filtering of a chrominance value comprises filtering the first pixel value so that the filtered first pixel value differs from the first pixel value by no more than a second parameter value that is strictly less than the first clipping control parameter value.

According to an embodiment, second parameter value is dependent on the space-frequency transforms used in the block of pixels.

According to an embodiment, obtaining the first clipping control parameter (tc) comprises:

obtaining a second clipping control parameter (tc') corresponding to a maximum bitdepth MaxBitDepth; and obtaining the first clipping control parameter (tc) by dividing the second clipping control parameter by a scale factor strictly lower than $2^{(MaxBitDepth-BitDepth)}$ for a bitdepth BitDepth.

According to an embodiment, the first clipping control parameter tc is given by:

$tc=(tc'+R(BitDepth))>>(MaxBitDepth-BitDepth)/2$;

where R(BitDepth) is a rounding function.

According to an embodiment, the first clipping control parameter tc is given by:

$tc=(tc'*g(BitDepth)+R)>>N$;

where R is a rounding positive integer value and N a positive integer value and wherein $g(bitdepth+1)<2*g(bitdepth)$ for some bitdepth values.

According to an embodiment, the function g is given in a table.

According to an embodiment, the values of bitdepth are comprised between 8 and 12.

According to an embodiment, a first clipping control parameter ($tc_y$, $tc_{cb}$, $tc_{cr}$) is obtained for each component of the block of pixels.

According to another aspect of the invention there is provided a method, by a video decoder or encoder, of filtering a block of pixels in an image decoded from a bitstream, comprising:

obtaining a first clipping control parameter (tc) value based on a quantization parameter of the block and a bitdepth of the pixel values;

comparing the difference between a first value of a first pixel located on one side of an edge of said block and a second value of a second pixel located on the other side of the edge with a predetermined threshold derived from the first clipping control parameter value; and determining whether to apply a filtering to the first pixel based on the result of the comparison, wherein obtaining the first clipping control parameter (tc) comprises:

obtaining a second clipping control parameter (tc') corresponding to a maximum bitdepth MaxBitDepth; and obtaining the first clipping control parameter (tc) by dividing the second clipping control parameter by a scale factor strictly lower than $2^{(MaxBitDepth-BitDepth)}$ for a bitdepth BitDepth; and wherein a first clipping control parameter ($tc_y$, $tc_{cb}$, $tc_{cr}$) is obtained for each component of the block of pixels.

According to an embodiment, the first clipping control parameter ($tc_y$, $tc_{cb}$, $tc_{cr}$) is given by:

$tc_Y=(tc'_Y*g_Y(BitDepthY)+R_Y)>>N_Y$,
$tc_{Cb}=(tc'_{Cb}*g_{Cb}(BitDepth_{Chroma})+R_{Cb})>>N_{Cb}$,
$tc_{Cr}=(tc'_{Cr}*g_{Cr}(BitDepth_{Chroma})+R_{Cr})>>N_{Cr}$;

where $R_Y$, $R_{Cb}$, $R_{Cr}$ are rounding positive integer values and $N_Y$, $N_{Cb}$, $N_{Cr}$ positive integer values and wherein:

$g_Y(BitDepthY+1)<2*g_Y(BitDepthY)$,
$g_{Cb}(BitDepth_{Chroma}+1)<2*g_{Cb}(BitDepth_{Chroma})$
$g_{Cr}(BitDepth_{Chroma}+1)<2*g_{Cr}(BitDepth_{Chroma})$ for some bitdepth values.

According to an embodiment, $R_{Cb}$, $R_{Cr}$ have the same value and wherein $N_{Cb}$, $N_{Cr}$ have the same value.

According to an embodiment, the first clipping control parameter is obtained based on a scale offset applied to the scale factor.

According to another aspect of the invention there is provided a method, by a video decoder or encoder, of filtering a block of pixels in an image decoded from a bitstream, comprising:
- obtaining a first clipping control parameter (tc) value based on a quantization parameter of the block and a bitdepth of the pixel values;
- comparing the difference between a first value of a first pixel located on one side of an edge of said block and a second value of a second pixel located on the other side of the edge with a predetermined threshold derived from the first clipping control parameter value; and
- determining whether to apply a filtering to the first pixel based on the result of the comparison,
- wherein obtaining the first clipping control parameter (tc) comprises:
- obtaining a second clipping control parameter (tc') corresponding to a maximum bitdepth MaxBitDepth; and
- obtaining the first clipping control parameter (tc) by dividing the second clipping control parameter by a scale factor strictly lower than $2^{(MaxBitDepth-BitDepth)}$) for a bitdepth BitDepth; and wherein:
- the first clipping control parameter is obtained based on a scale offset applied to the scale factor.

According to an embodiment, the first clipping control parameter tc is given by:

tc=(TcTable[QP+TcOffset]*(g(BitDepthY)+ScaleOffset)+R)>>N;

where R is a rounding positive integer value, N a positive integer value, QP the quantization parameter of the block, g(BitDepthY) is the scale factor, ScaleOffset is the scale offset, TcOffset and ScaleOffset are signed integer.

According to an embodiment, TcOffset and ScaleOffset are transmitted in the bitstream.

According to an embodiment, TcOffset and ScaleOffset are signalled at different level in the bitstream.

According to an embodiment, the first clipping control parameter is obtained based on a scale factor transmitted in the bitstream.

According to another aspect of the invention there is provided a method, by a video decoder or encoder, of filtering a block of pixels in an image decoded from a bitstream, comprising:
- obtaining a first clipping control parameter (tc) value based on a quantization parameter of the block and a bitdepth of the pixel values;
- comparing the difference between a first value of a first pixel located on one side of an edge of said block and a second value of a second pixel located on the other side of the edge with a predetermined threshold derived from the first clipping control parameter value; and
- determining whether to apply a filtering to the first pixel based on the result of the comparison,
- wherein obtaining the first clipping control parameter (tc) comprises:
- obtaining a second clipping control parameter (tc') corresponding to a maximum bitdepth MaxBitDepth; and
- obtaining the first clipping control parameter (tc) by dividing the second clipping control parameter by a scale factor strictly lower than $2^{(MaxBitDepth-BitDepth)}$ for a bitdepth BitDepth; and wherein:
- the first clipping control parameter is obtained based on a scale factor transmitted in the bitstream.

According to an embodiment, the first clipping control parameter tc is given by:

tc=(TcTable[QP+TcOffset]*TcScale+R)>>N;

where R is a rounding positive integer value, N a positive integer value, QP the quantization parameter of the block, TcScale is the scale factor.

According to an embodiment, the first clipping control parameter tc is given by:

tc=(TcTable[QP]*TcScale+R)>>N;

where R is a rounding positive integer value, N a positive integer value, QP the quantization parameter of the block, TcScale is the scale factor.

According to an embodiment, a first clipping control parameter ($tc_y$, $tc_{cb}$, $tc_{cr}$) is obtained for each component of the block of pixels.

According to an embodiment, the second clipping control parameter (tc') is obtained from a table among a plurality of tables.

According to another aspect of the invention there is provided a method, by a video decoder or encoder, of filtering a block of pixels in an image decoded from a bitstream, comprising:
- obtaining a first clipping control parameter (tc) value based on a quantization parameter of the block and a bitdepth of the pixel values;
- comparing the difference between a first value of a first pixel located on one side of an edge of said block and a second value of a second pixel located on the other side of the edge with a predetermined threshold derived from the first clipping control parameter value; and
- determining whether to apply a filtering to the first pixel based on the result of the comparison,
- wherein obtaining the first clipping control parameter (tc) comprises:
- obtaining a second clipping control parameter (tc') corresponding to a maximum bitdepth MaxBitDepth; and
- obtaining the first clippling control parameter (tc) by dividing the second clipping control parameter by a scale factor strictly lower than $2^{(MaxthtDepth-BitDepth)}$ for a bitdepth BitDepth; and wherein:
- the second clipping control parameter (tc') is obtained from a table among a plurality of tables.

According to an embodiment, the table among the plurality of tables is determined based on the type of component.

According to an embodiment, the table among the plurality of tables is determined based on the type of image.

According to an embodiment, the table among the plurality of tables is determined based on an index in the bitstream. According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a device comprising a processor configured for executing all the steps of the method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
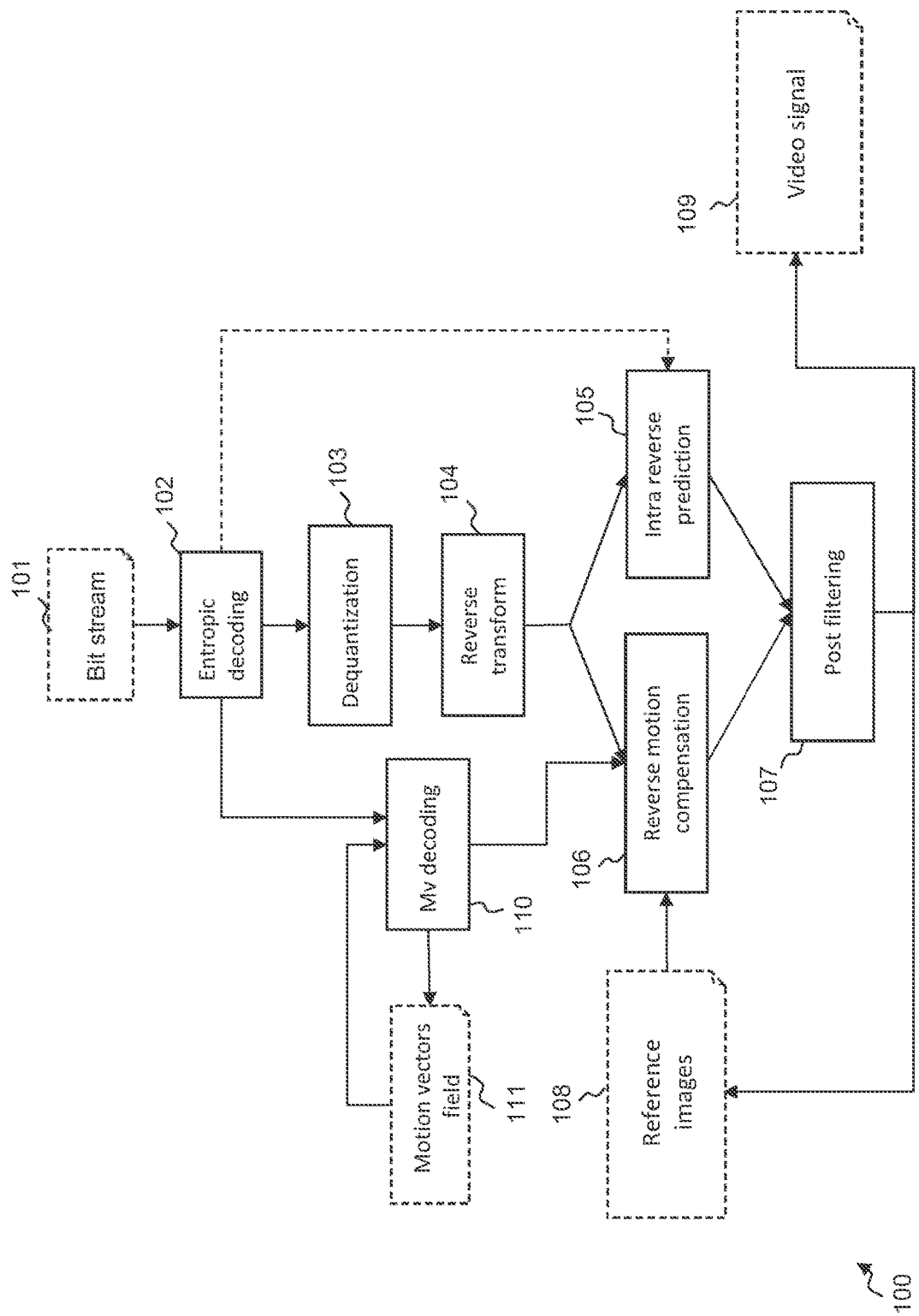
FIG. 1 illustrates a block diagram of a decoder with deblocking filtering.

Deblocking filtering concerns the filtering of samples values, and by extension pixels values, in the neighbourhood of the boundary of two blocks of pixels. The blocks of pixel may be coding blocks or transform blocks. A coding block is a block of pixels used as a basic entity in coding, while a transform block is a block of samples used as a basic entity for quantization. In some embodiments, a coding block may be divided into several transform blocks for quantization. The boundary may be vertical between the currently decoded block and the previously decoded block located on its left. The boundary may also be horizontal between the currently decoded block and the previously decoded block located on its top.

Each sample is typically a triplet of three values, Y, U and V, where Y is the luminance of the sample, U and V are the two chrominance of the sample. The block may therefore be seen as forming three blocks of values, one block for each component, Y, U and V.

In a first step, the control parameter bS, for boundary strength, is determined according to a set of criteria. This is typically performed on an 8×8 block basis, although some of the other processing in the deblocking loop-filter occurs on 4 sets of columns or rows at a time along the edges of said 8×8 blocks.

The value of bS is determined to be "2" when at least one of the two blocks lying to both sides of the boundary is encoded according to an INTRA coding mode. INTRA coding modes are coding modes where the block predictor for encoding the current block is determined from pixels values within the current image.

The value of bS is determined to be "1" if any one of the following condition is met:
At least one of the two blocks has non-zero coded residual coefficient and boundary is a transform boundary. A transform boundary being a boundary between two transform units.
The absolute difference between corresponding spatial motion vector components of the two blocks are greater or equal to 1 in units of integer pixels.
The motion compensated prediction for the two blocks refers to different reference pictures or the number of motion vectors is different for the two blocks The value of bS is determined to be zero if none of these conditions are met.

It is to be noted that the boundary strength does not depend on actual pixel values but on coding information like coding mode, residual presence, or motion information. When the boundary strength is determined to be zero, no filtering occurs on this boundary. The invention does not use the boundary strength and may apply to embodiments where the definition of the boundary strength is modified compared to the herein description.

Once the boundary strength bS has been determined, the control parameters $\beta$ and tc must be determined. These control parameters are determined for the luminance value of pixels and also, with different results, for chrominance values of pixels.

The determination of $\beta$ and tc is based on the following parameters:
the boundary strength bS that has been determined,
some offsets value which are determined at the frame or slice level, meaning that their values are defined at encoding and found as parameter in the bitstream, namely slice_beta_offset_div2 and slice_tc_offset_div2,
the quantization parameters of the two blocks P and Q separated by the current boundary and noted QPp and QPq,
the bitdepth of the luminance component of the pixel, $BitDepth_Y$, meaning the number of bits used to code the luminance value of a pixel.

In a first step, a value qPL is computed according to:

$qPL=((QPq+QPp+1)\gg1)$ where X>>y, means integer value X shifted to the right by y bits, i.e. divided by $2^y$, the result of which is still an integer.

It is to be noted that $qP_L$ is representative of the mean value of the quantization parameter of the two blocks.

From the value $qP_L$, a first Q value is computed for $\beta$ according to:

$Q=\text{Clip3}(0,51,qPL+(\text{slice\_beta\_offset\_div2}\ll1))$

Where Clip3(X, Y, Z)=X if Z<=X, Y if Z>=Y, Z if X<Z<Y; and

X<<y, means integer value X shifted to the left by y bits, i.e. multiplied by $2^y$, the result of which is still an integer.

It is to be noted that the function Clip3 is the clipping of value Z in the range [X, Y] meaning that this first Q value is comprised between 0 and 51.

From the value $qP_L$, a second Q value is computed for tc according to:

$Q=\text{Clip3}(0,53,qPL+2*(bS-1)+(\text{slice\_tc\_offset\_div2}\ll1))$

This second Q value is representative of the average of the quantization parameter of the two blocks plus an offset value.

It is to be noted that the second Q value is comprised between 0 and 53.

The first and the second Q values are used, respectively, to get β' and tc' in the following table:

| Q   | 0  | 1  | 2  | 3  | 4  | 5  | 6  | 7  | 8  | 9  | 10 | 11 | 12 | 13 | 14 | 15 | 16 | 17 | 18 |
|-----|----|----|----|----|----|----|----|----|----|----|----|----|----|----|----|----|----|----|----|
| β'  | 0  | 0  | 0  | 0  | 0  | 0  | 0  | 0  | 0  | 0  | 0  | 0  | 0  | 0  | 0  | 0  | 0  | 6  | 7  | 8 |
| tc' | 0  | 0  | 0  | 0  | 0  | 0  | 0  | 0  | 0  | 0  | 0  | 0  | 0  | 0  | 0  | 0  | 0  | 0  | 1 |

| Q   | 19 | 20 | 21 | 22 | 23 | 24 | 25 | 26 | 27 | 28 | 29 | 30 | 31 | 32 | 33 | 34 | 35 | 36 | 37 |
|-----|----|----|----|----|----|----|----|----|----|----|----|----|----|----|----|----|----|----|----|
| β'  | 9  | 10 | 11 | 12 | 13 | 14 | 15 | 16 | 17 | 18 | 20 | 22 | 24 | 26 | 28 | 30 | 32 | 34 | 36 |
| tc' | 1  | 1  | 1  | 1  | 1  | 1  | 1  | 1  | 1  | 2  | 2  | 2  | 2  | 3  | 3  | 3  | 3  | 4  | 4  | 4 |

| Q   | 38 | 39 | 40 | 41 | 42 | 43 | 44 | 45 | 46 | 47 | 48 | 49 | 50 | 51 | 52 | 53 |
|-----|----|----|----|----|----|----|----|----|----|----|----|----|----|----|----|----|
| β'  | 38 | 40 | 42 | 44 | 46 | 48 | 50 | 52 | 54 | 56 | 58 | 60 | 62 | 64 | —  | —  |
| tc' | 5  | 5  | 6  | 6  | 7  | 8  | 9  | 10 | 11 | 13 | 14 | 16 | 18 | 20 | 22 | 24 |

In the following, the expression "TcTable" may be used to refer to the part of the above table linking Q to tc'.

Finally, the control parameters β and tc are obtained from β' and tc' according to:

$$\beta = \beta'*(1<<(BitDepth_Y-8))$$

$$tc = tc'*(1<<(BitDepth_Y-8))$$

For a bitdepth of 8 bits, we get tc=tc'. The tabulated value tc' correspond to the clipping control parameter tc, used in particular in the previously mentioned clipping operations and in filtering criterion, for a bitdepth having the value 8. When the bitdepth increases, tc corresponds to tc' multiplied by a multiplying factor that increases with the bitdepth. According to this equation, the multiplying factor corresponds to $2^{(BitDepth_Y-8)}$.

It is to be noted that the above β and tc values are given for the luminance component. For the chrominance component, β and tc values are computed similarly with the quantization parameters defined for chrominance and the bitdepth $BitDepth_C$ of the chrominance component. As a consequence, BitDepth may be used instead of $BitDepth_Y$ to generalize the methods presented to other components than luma.

Control parameter bS is defined at the level of each boundary as its computation depends on the particular encoding modes and parameter of the two blocks surrounding the boundary. Control parameters β and tc are defined at the level of the transform unit as the presence of residuals (usually represented by a coded block flag, organized in a quadtree for HEVC) may vary from transform unit to transform unit. Similarly, the quantization parameter may vary between two neighbouring coding units.

Figure 2:
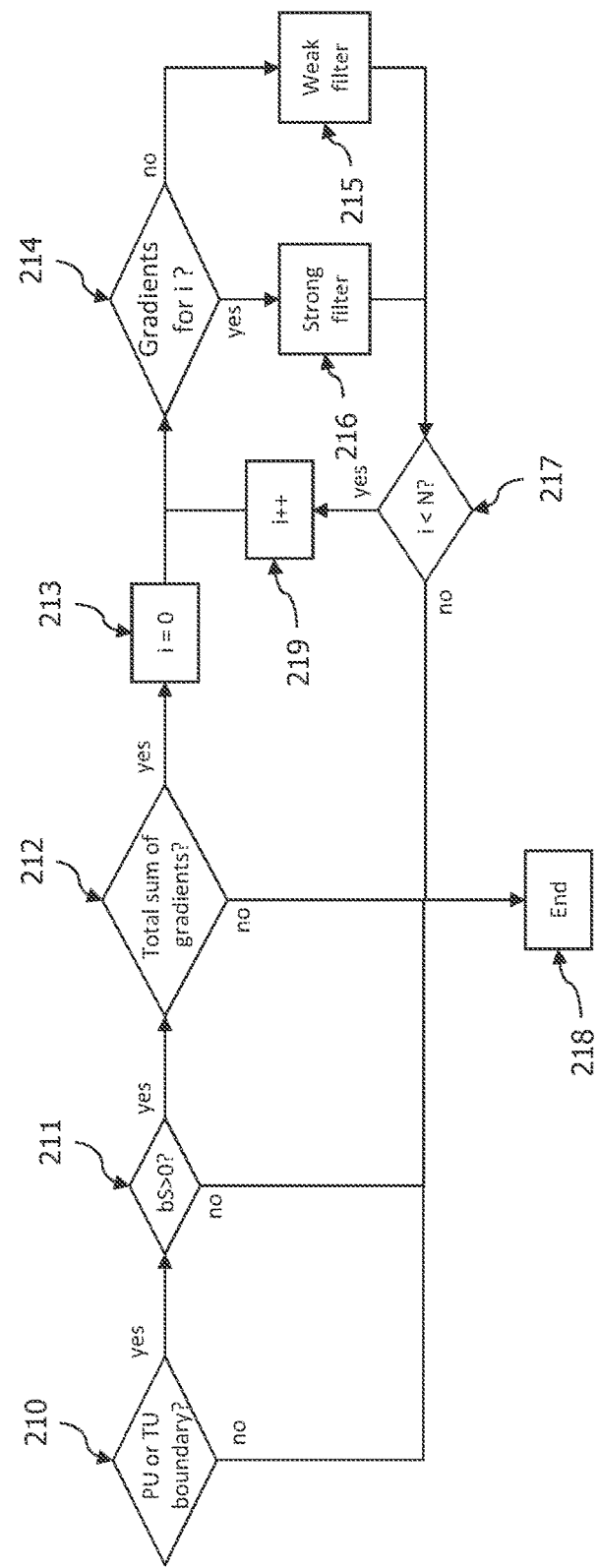
FIG. 2 illustrates the deblocking filtering of a boundary between two 4×4 block of pixels P and Q.

FIG. 2 illustrates the deblocking filtering of a boundary between two 4×4 blocks of pixels P and Q. Pixels of blocks P and Q are identified as the set of pixels 200. Per convention, the pixels $pi_j$ are in block P, which has been coded before block Q, which contains pixels $qi_j$. "i" indicates the column and "j" the line index of the pixel in the block. The converse horizontal boundary where P is on top of Q works the same with obvious adaptations.

On step 210, it is checked whether the boundary for a set of pixels lies on a PU (prediction unit) or a TU (transform unit) boundary. The test is true on a PU or on a TU boundary, and false when not on such a boundary. This step is here to invoke the algorithm only on PU or TU boundaries.

Step 211 checks whether the boundary strength bS, as determined above, is non-null. If it is non-null, the boundary is to be filtered.

Various gradient strengths are to be measured on step 212. Also, please note that for simplicity sake, the determination of control parameters β and tc can be seen as performed here, as the parameters depend on the exact position on the boundary, because the QPs on the P side may vary.

The sum of these gradients is measured and compared to β. For HEVC, and so far for JVET, this corresponds to the following equation:

$$|p2_0-2p1_0+p0_0|+|p2_3-2p1_3+p0_3|+|q2_0-2q1_0+q0_0|+\\|q2_3-2q1_3+q0_3|<\beta$$

If this sum is low enough, the blocks on each side are considered susceptible enough to noticeable blocking artefacts, and deblocking continues with step 213, otherwise the set of pixels is considered not to need filtering, and its deblocking ends on step 218.

Step 213 starts the iteration over 1D subsets of pixels: lines for a vertical boundary as illustrated on FIG. 2 and similarly columns for a horizontal boundary. Therefore, the first said 1D subset is selected on this step by setting an index i to 0. Please note that several operations irrelevant to the invention, further checking what to filter based on further comparing gradient to β, or coding parameters (e.g. IPCM or lossless), have been omitted.

Step 214 determines whether so-called strong or weak filtering is to be applied to the 1D subset. For this purpose, gradients on each side of the boundary are measured. For HEVC, and so far for JVET, the corresponding comparisons to β are used as criteria for the decision:

$$|p2_i-2p1_i+p0_i|+|q2_i-2q1_i+q0_i|<\oplus/8$$

$$|p3_i-p0_i|+|q0_i-q3_i|<\oplus/4$$

Another criterion of greater relevance relies on tc:

$$|p0i-q0i|<((1+5*tc)>>1)$$

The choice of the strong or weak filter is made by comparing the gradient to a threshold based on the clipping control parameter tc. As tc is an integer, the above computation performs a rounding to an integer, e.g. for tc=3, the result is 8 and for tc=4, it is 10.

If all these criteria are satisfied, strong filtering can be applied on the 1D subset at step 216, otherwise weak filtering is applied on the 1D subset at step 215.

Whether this was the last 1D subset to filter is checked on step 217. For HEVC, and JVET so far, the number of 1D subset is 4. If it is the case, all pixels of the set have been filtered, and filtering stops on step 218. Otherwise, next 1D subset is selected on step 219 by incrementing i.

It is to be noted that the whole process of FIG. 2 only apply to luminance component. For chrominance component, the only criterion checked to enable the filtering is whether bS is strictly greater than 1.

The strong filtering for the luminance component will now be described. For pixels $p2_i$ to $p0_i$ and $q0_i$ to $q2_i$, a linear combination of itself with its two neighbours on each side (total 4) is computed. If one of them would not belong to set 200, it is omitted and the weights of the linear combination are modified accordingly. Without listing all of them (they are symmetrical for $qj_i$), this results in the following computations for HEVC (and JVET so far):

$$p2_i = \text{Clip3}(p2_i - 2*tc, p2_i + 2*tc, (2*p3_i + 3*p2_i + p1_i + p0_i + q0_i + 4) >> 3)$$

$$p1_i = \text{Clip3}(p1_i - 2*tc, (p2_i + p1_i + 2*tc, (p2_i + p1_i + p0_i + q0_i + 2) >> 2)$$

$$p0_i = \text{Clip3}(p0_i - 2*tc, (p2_i + 2*tc, (p2_i + 2*p1_i + 2p0_i + 2*q0_i + q1_i + 4) >> 3)$$

The weak filtering for the luminance component will now be described. The filtering of the complete 1D subset is conditioned to:

$$\Delta = (9*(q0_i - p0_i) - 3*(q1_i - p1_i) + 8) >> 4$$

$$\Delta < 10 * tc$$

If the condition is met, filtering for $q0_i$ and $p0_i$ can be performed as follows:

$$\Delta = \text{Clip3}(-tc, tc, \Delta)$$

$$p0_i' = \text{Clip1}Y(p0_i + \Delta)$$

$$q0_i' = \text{Clip1}Y(q0_i - \Delta)$$

with Clip1Y(val) the equivalent of Clip3(minY, maxY, val) and minY and maxY being respectively the minimal and maximal sample values, i.e. 0 and 255 for 8 bits content.

Then, if $p1_i$ is to be filtered (according to conditions irrelevant to the invention as depending on β), the following applies:

$$\Delta p = \text{Clip3}(-((tc>>1), tc>>1, (((p2 + p0_i + 1) >> 1) - p1_i + \Delta) >> 1)$$

$$p1_i' = \text{Clip1}Y(p1_i + \Delta p)$$

Similarly, if $q1_i$ is to be filtered, the following applies:

$$\Delta q = \text{Clip3}(-((tc>>1), tc>>1, (((q2_i + q0_i + 1) >> 1) - q1_i - \Delta) >> 1)$$

$$q1_i' = \text{Clip1}Y(q1_i + \Delta q)$$

Regarding the filtering of the chrominance component, when bS>1, when at least one of blocks P and Q is coded as INTRA. In this case, the simplified filtering obeys:

$$\Delta = \text{Clip3}(-tc, tc, ((((q0_i - p0_i) << 2) + p1_i - q1_i + 4) >> 3))$$

$$p0_i' = \text{Clip1}C(p0_i + \Delta)$$

$$q0_i' = \text{Clip1}C(q0_i - \Delta)$$

The derivation and use of the clipping control parameter tc suffers from a number of inefficiencies or inaccuracies, in particular its derivation from bitdepth is way too coarse and, at least in JVET, the range of allowed variations in the filtered output is too large, especially when considering the quantization error distribution at a given quantizer step, which has narrowed due to the improvements in JVET. Indeed, the clipping applied can be considered to be the maximum range above which it is uncertain which part is a blocking artefact due to quantization, and actual details such as an edge.

According to a first embodiment of the invention, the derivation of the clipping control parameter tc is not modified. The clipping control parameter tc is still determined as in the prior art based on the quantization parameter of the block.

Regarding the conditions used to determine between the strong filtering and the weak filtering of the pixels, the main condition is the equation:

$$|p0i - q0i| < ((1 + 5*tc) >> 1)$$

This condition is still used and is not amended, meaning that the difference between a pixel value located on one side of a boundary and a pixel located on the other side of the boundary is compared to a threshold derived from the clipping control parameter tc.

We have seen that the clipping used in the strong filtering that limit the extent of the filtering is given by equations:

$$p2_i = \text{Clip3}(p2_i - 2*tc, p2_i + 2*tc, (2*p3_i + 3*p2_i + p1_i + p0_i + q0_i + 4) >> 3)$$

$$p1_i = \text{Clip3}(p1_i - 2*tc, p1_i + 2*tc, (p2_i + p1_i + p0_i + q0_i + 2) >> 2)$$

$$p0_i = \text{Clip3}(p0_i - 2*tc, p0_i + 2*tc, (p2_i + 2*p1_i + 2p0_i + 2*q0_i + q1_i + 4) >> 3)$$

Meaning that, for all pixels, the filtered pixel value differs from the original pixel value by no more than 2*tc.

According to this first embodiment, the clipping range is reduced to [−tc, tc], meaning that the filtered pixel value differs from the original pixel value by no more than tc. This may be achieved by replacing the clipping control parameter tc in the clipping equation of the strong filtering by a second clipping control parameter $tc_2$ which is lower or equal to tc/2.

While this is the preferred embodiment, as soon as the clipping range becomes strictly lower than 2*tc, the results are improved. This means that the invention covers a reduction of the clipping range for the strong filter to bring the range strictly lower than 2*tc, and similarly strictly lower than tc for the weak filter and the chrominance when applied to these also.

One can therefore define a second clipping control parameter tc2 corresponding, for example, to tc/2 for clipping, as tc has been found in experiments to be too strong. In this embodiment the second clipping parameter tc2 is used only in the clipping operation intervening in the strong filtering and/or in the weak filtering. This second clipping parameter is not used in the computation of the criterion involved in taking the decision of filtering and determining which filtering, strong or weak, is to be applied. In other embodiments described below, the computation of the first clipping parameter tc is improved with an impact on both the computation of the criterion and the clipping operations. In further embodiments, these two aspects are combined, an improved computation of the first clipping parameter tc impacting the criterion and the clipping operations and the computation of a second clipping parameter tc2, based on the improved first clipping parameter tc, used only in the clipping operations.

In some embodiments, $tc_2 = tc/2$.

In some embodiments, $tc_2 = tc/N$, with N an integer greater or equal to 2.

In some embodiments, $t_{C2}=t_C/2^N$, with N an integer greater or equal to 1.

In some embodiments, $tc_2$ is given by a table indexed by tc values. For example, $tc_2$=TcTable2[tc], with TcTable2[tc] lower or equal to tc for all tc values.

In some embodiments, the second clipping control parameter $tc_2$ is used also for clipping in the weak filtering. Namely, the clipping equation of the weak filtering Δ=Clip3 (−tc, tc, Δ) is replaced by Δ=Clip3(−$tc_2$, $tc_2$, Δ).

Similarly, the equations can be modified as follows:

$$\Delta p=\text{Clip3}(-((tc_2>>1),tc_2>>1,(((p2_i+p0_i+1)>>1)-p1_i+\Delta)>>1)$$

$$\Delta q=\text{Clip3}(-((tc_2>>1),tc_2>>1,(((q2_i+q0_i+1)>>1)-q1_i-\Delta)>>1)$$

In further embodiments, the second clipping control parameter $tc_2$ used is adaptive and signaled, possibly at the CTB, slice, tile or image level. This signalization level can be arbitrary, i.e. declared in number of samples or CTB, and can be independent for luma and chroma. The adaptiveness can rely on signaling the value of N, or as the offset into the sets of available clip range modifiers (e.g. ½, ¾, ¼, . . . ).

In yet further embodiments, the second control parameter $tc_2$ is dependent of the space-frequency transforms used in the block. In JVET, for instance, these transforms are separable into a vertical 1D pass and another horizontal 1D pass. The sets of available transform for each pass can differ according to the coding mode, signaled information and whether it is a horizontal or vertical pass, as is the case for JVET. For instance, DST-IV, DST-VII, DCT-II and DCT-IV are known transform functions classically used there. Accordingly, the second control parameter tc2 may depend on whether it is a vertical or horizontal boundary, and thus which transforms have been used in each pass.

The previous embodiments concern the reduction of the range clipping for filtering the luminance component. In some embodiment, the range clipping used in filtering the chrominance component may be also reduced. Typically, the clipping equation:

$$\Delta=\text{Clip3}(-tc,tc,((((q0_i-p0_i)<<2)+p1_i-q1_i+4)>>3));$$

becomes:

$$\Delta=\text{Clip3}(-tc_2,tc_2,((((q0_i-p0_i)<<2)+p1_i-q1_i+4)>>3)).$$

In some embodiments, the use of the reduced clipping range in filtering may be conditioned to some criterion. The used criterion may be based on specific coding properties, such as the activation of some other in-loop filters, in particular the Adaptive Loop Filter (ALF). The used criterion may also be based on the use for either or both of the P and Q block of specific coding tools, in particular Overlapped Block Motion Compensation or Reference Sample Adaptive Filtering. In some embodiments, the criterion may be based on the kind of codec used, for example regular range may be used for HEVC while reduced range may be used for JVET.

Adaptive Loop Filter (ALF) is an adaptive convolution filter, the shape and coefficients of which can be adapted throughout the image, with their signaling implicit (with or without prediction). Currently in JVET, the shape is usually a square turned 45° sideways, but can be a cross, and the length in one dimension varies from 3 to 9. ALF has seen extensive change through its design, but the prevalent property is the adaptive convolution and its location after deblocking filtering (and SAO).

Overlapped Block Motion Compensation is a probabilistic prediction model for motion information that render the prediction of motion information more continuous on the boundaries of blocks.

Reference Sample Adaptive Filtering is a technique used in JVET to filter the reference samples used in generating the predictor blocks in INTRA coding mode prediction. The actual filter used may be signaled in the bitstream. This technique allows an improved continuity in the prediction generated in JVET.

The adaptive multiple transforms, like DST, DCT, are the transforms that can be used for transforming block values into blocks of transform coefficients which are then subject to quantization.

Figure 5:
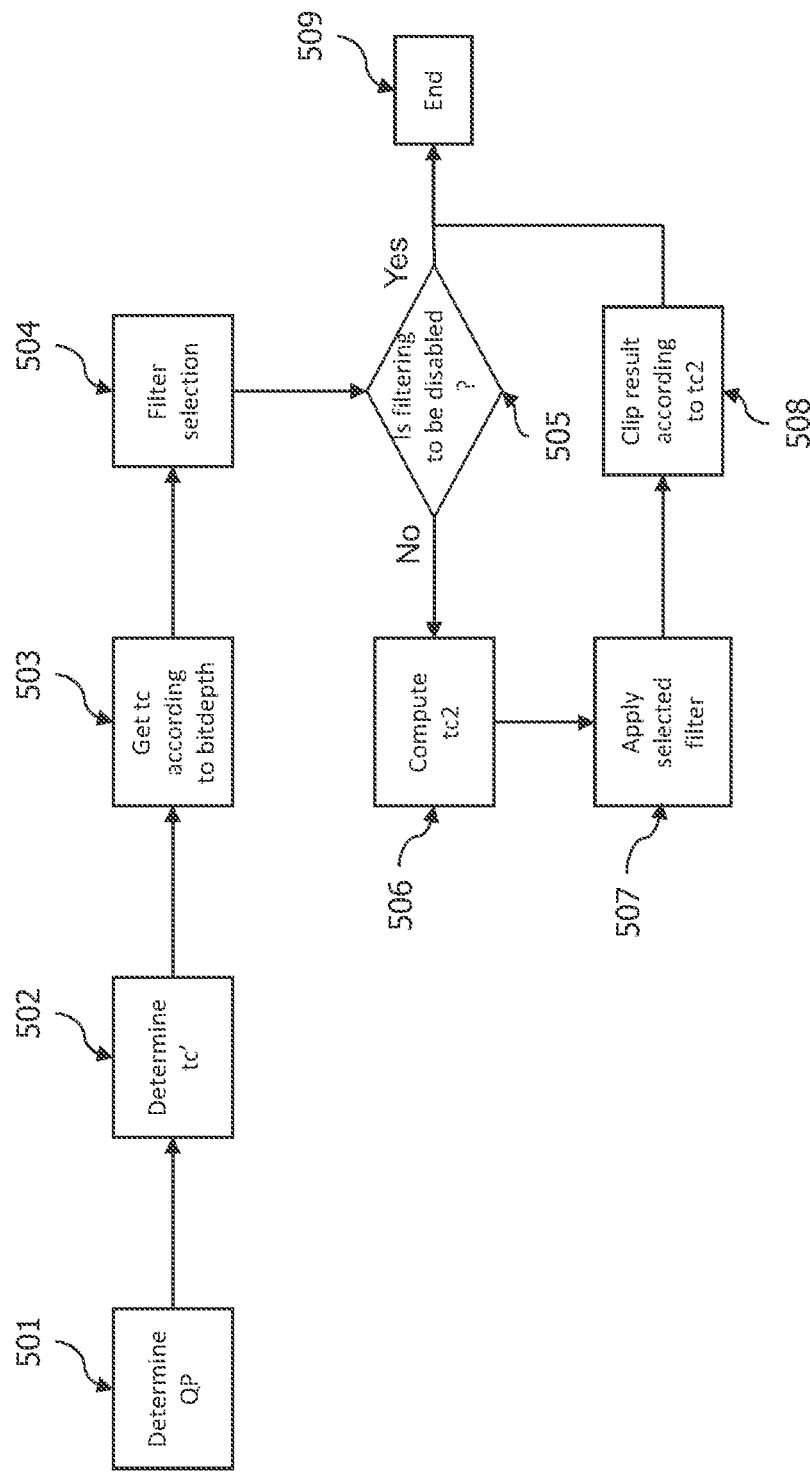
FIG. 5 is a simplified representation of the deblocking filter with only steps relevant to the tc control parameter.

FIG. 5 illustrates the various uses of the first clipping control parameter tc parameter impacted by the modifications of the invention. As such, it is a simplified view of the deblocking filter with only steps relevant for the use of said parameter.

Therefore, step 501 first determines the quantizer step, e.g. through the equation linking qPL to Q previously presented. Step 502 then deduces the tc' parameter, e.g. by doing a lookup into a table. Step 503 then derives the final tc parameter according to bitdepth, e.g. by applying the scaling means of the present invention, or other means, including prior art.

Step 504 then selects the appropriate filter according to tc. In HEVC, the equation $$|p0i-q0i|<((1+5*tc)>>1)$$

is used to select between so-called weak and strong luma filters. Obviously, the number and type of such filters, their definition, and the rules and thresholds employing tc may vary. The purpose of this step here is to illustrate a use akin to feature detection, to distinguish from other operations where actual clipping is done during filtering. Therefore, and similarly, step 505 checks whether the selected filter should be applied. Again, in HEVC, this consists in computing the aforementioned Δ value and compare it to threshold 10*tc, thereby illustrating another feature detection. If the filtering is skipped, then processing ends on step 509.

Otherwise, in some embodiments, the second clipping control parameter $tc_2$ is computed on optional step 506. Step 507 then applies the selected filter, and the output sample values are restricted in their variations around the samples being filtered, the clipping operation, according to tc or $tc_2$ on step 508. Now that the final output sample value has been determined, deblocking stops on step 509.

Figure 3:
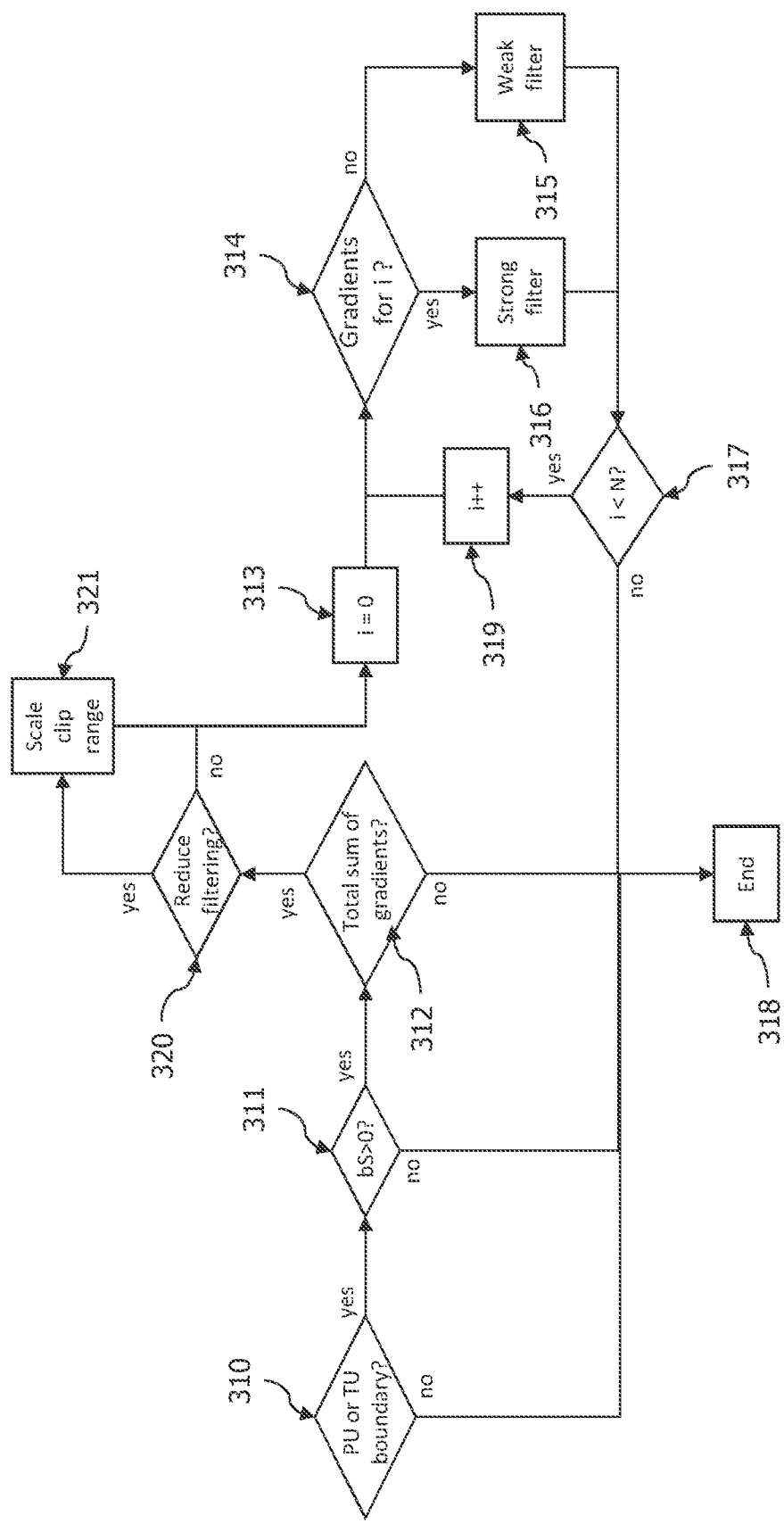
FIG. 3 illustrates an embodiment of a conditional reduced clipping range filtering method according to an embodiment of the invention.

FIG. 3 illustrates an embodiment of a conditional reduced clipping range filtering method as described above.

It is an updated version of FIG. 2, steps 310 to 318 are respectively identical to steps 210 to 218, while new step 320 and 321 implements aspects of the invention.

Step 320 checks whether the clipping range should be modified according to a criterion as described above.

Step 321 then modifies said clipping range. In the preferred embodiment, it consists in scaling down (i.e., produce a lower value) the tc value used for clipping operations. Typically, this is where the second clipping control parameter $tc_2$ is computed from the clipping control parameter tc. This second clipping control parameter $tc_2$ is then used in some or all of the clipping operations in filtering comprising the strong filtering of the luminance component.

We have seen that the clipping control parameter tc derives from a tabulated tc' value according to $2^{(BitDepth-8)}$. This has been found in experiments to be too strong. According to experiments, an intermediate result gives the best results. Moreover, by defining the clipping control parameter for a bitdepth of 8 and multiplying it for greater bitdepth, the resulting value lacks of precision for these greater values of bitdepth. This embodiment is an alternative method for reducing the clipping range regarding the prior art. This embodiment improving the computation of the clipping parameter tc may be combined with the first embodiment defining a second clipping parameter $tc_2$ for clipping operations.

According to this embodiment, the tabulated value tc' corresponds to the maximum envisaged bitdepth, MaxBitDepth=16 in the exemplary embodiment, and the actual clipping control parameter is obtained by dividing this tabulated value by a dividing factor to get the final value of the clipping control parameter tc for lower values of bitdepth. By keeping the dividing factor strictly lower than $2^{(MaxBitDepth-BitDepth)}$ for an actual bitdepth of BitDepth, we guarantee that the multiplying factor between two values of tc corresponding to successive values of bitdepth is strictly lower than 2, and advantageously greater than 1. This correspond to having the ratio between two range clipping values corresponding to two successive values of bitdepth strictly lower than 2. By defining the tabulated value tc' for a maximum bitdepth, its extension in value is greater and it allows to define the values of tc', and therefore the values of the clipping control parameter tc, with a better precision. By keeping this multiplying factor between tc and tc' strictly lower than $2^{(BitDepth-8)}$, we guarantee that the clipping range is actually reduced compared to the prior art where this multiplying factor is equal to $2^{(BitDepth-8)}$.

Embodiments modifying this formula may consist in the following modifications. Currently, the equation to obtain the clipping control parameter tc for the tabulated value tc' consists in multiplying by $2^{(BitDepth-8)}$ a value in the table. When operating at 10 or even 12 bits, this exhibits a significant quantization, e.g. several items maybe at 4 and then the following ones being 8 without any intermediate values.

The preferred embodiment here is to increase the precision in the table, e.g. by modelling said table, then increase the precision by pre-multiplying the values provided by the model with a constant. An example of this is:

$$TcTable[Q]=8*e^{(0.113*Q-2.64)}$$

where the table was modelled as an exponential law between a given Q value and the target tc' value, and the pre-multiplier being 8 This results in the following table:

Finally, to obtain the final value of tc, following equations may be used:

$$tc=(tc'+R(BitDepth))>>f(BitDepth),$$

Or $$tc=(tc'*g(BitDepth)+R)>>N,$$

with the condition: g(BitDepth+1)<2*g(BitDepth)
In the preferred embodiments are functions R, f and g are:

$$f(BitDepth)=(16-BitDepth)/2$$

$$g(BitDepthY)=16*2^{(B*BitDepth+C)} \text{ with } B=0.857 \text{ and } C=-7.44$$

$$R(BitDepthY)=R=0$$

It should be noted that B<1, as expected with the observation that g(BitDepth+1)<2g(BitDepth) for at least bitdepths between 8 and 11.

The function g is called a scale function. The later equation for g, similarly to TcTable, is ideally precomputed and stored in a table. As the storage needed for the table is a classical problem in implementation cost, N is usually a compromise between the size of the table for g, and precision, also dictated by TcTable. Therefore, and for the sake of example, if values in TcTable were to be doubled for precision purposes, then N would be increased by 1. An example for the above TcTable and N=6 (allowing here values in the table for g to fit in 8 bits) is:

|   | BitDepth | | | | |
|---|---|---|---|---|---|
|   | 8 | 9 | 10 | 11 | 12 |
| g | 11 | 21 | 33 | 63 | 115 |

It is to be noted that the equation using function g corresponds to dividing tc' by $2^N$ and then to mutiply by g with a potential additive correction by R. The condition g(BitDepth+1)<2*g(BitDepth) guarantees that the multiplicative factor between the values of tc corresponding to two successive value of bitdepth is strictly lower than $2^{(BitDepth-8)}$; and consequently that the clipping range for the strong filter is strictly lower than 2*tc.

It is to be noted that the first alternative using function f, with function R being null, gives tc=tc' for bitdepth=16. And a multiplying factor between tc and tc' corresponding to $2^{(16-BitDepth)/2}$ corresponding to $2^{(BitDepth-8-1)}$. This corre-

| Q   | 0  | 1  | 2  | 3  | 4  | 5  | 6  | 7  | 8  | 9  | 10 | 11 | 12 | 13 | 14 | 15 | 16 | 17 | 18 |
|-----|----|----|----|----|----|----|----|----|----|----|----|----|----|----|----|----|----|----|----|
| tc' | 0  | 0  | 0  | 0  | 0  | 1  | 1  | 1  | 1  | 1  | 1  | 1  | 2  | 2  | 2  | 3  | 3  | 3  | 4  |
| Q   | 19 | 20 | 21 | 22 | 23 | 24 | 25 | 26 | 27 | 28 | 29 | 30 | 31 | 32 | 33 | 34 | 35 | 36 | 37 |
| tc' | 4  | 5  | 6  | 6  | 7  | 8  | 9  | 10 | 12 | 13 | 15 | 16 | 18 | 21 | 23 | 26 | 29 | 33 | 37 |
| Q   | 38 | 39 | 40 | 41 | 42 | 43 | 44 | 45 | 46 | 47 | 48 | 49 | 50 | 51 | 52 | 53 |    |    |    |
| tc' | 41 | 46 | 52 | 58 | 65 | 73 | 82 | 92 | 103| 115| 129| 144| 162| 181| 203| 227|    |    |    |

Compared to HEVC, the precision of its elements has been increased from 5 to 8 bits: this is a reasonable change on the storage size. Also please note that this is only a starting point: the model, or particular points can be optimized under visual inspection.

spond to having the ratio between two range clipping values corresponding to two successive values of bitdepth strictly lower than 2.

This second embodiment brings a reduction of the clipping range with an improved precision of the values of the clipping control parameter, especially for bitdepth values greater than 8. This improved computation of the clipping control parameter tc can be used for both the filtering of the luma components and the filtering of the chroma components.

Nevertheless, it appears that the blocking artefacts may differ between components and particularly between luma and chroma components. The chroma components are generally smoother and behaves differently from luma component when quantized, even using a same quantification parameter. Moreover, the standard allows situations where luma and chroma components are not coded with pixels having the same bitdepth. For all these reasons, the determination of the clipping parameter tc is advantageously adapted for each component.

Taking the previous equation giving the improved computation of the clipping parameter tc:

$$tc=(tc'*g(\text{BitDepth})+R)>>N,$$

the computation of differentiated clipping parameters for each components may be defined according to the following equations:

$$tc_Y=(tc'_Y*g_Y(\text{BitDepth}Y)+R_Y)>>N_Y,$$

$$tc_{Cb}=(t'_{Cb}*g_{Cb}(\text{BitDepth}_{Chroma})+R_{Cb})>>N_{Cb},$$

$$tc_{Cr}=(tc'_{Cr}*g_{Cr}(\text{BitDepth}_{Chroma})+R_{Cr})>>N_{Cr};$$

Where Y refers to the luma component, Cb and Cr refer to the two chroma components. In these equations, the bitdepth of both chroma components have been considered to be equal to $\text{BitDepth}_{Chroma}$, the equations may be adapted if this is not the case. The g functions may be defined in tables according to the following example:

| | BitDepth | | | | |
|---|---|---|---|---|---|
| | 8 | 9 | 10 | 11 | 12 |
| $g_Y$ | 9 | 16 | 28 | 49 | 86 |
| $g_{Cb}$ | 12 | 20 | 35 | 59 | 100 |
| $g_{Cr}$ | 13 | 21 | 36 | 58 | 101 |

The values $tc'_Y$, $tc'_{Cb}$, $tc'_{Cr}$ are derived from the table as described previously based on the quantization parameter Q. We called this table TcTable to differentiate from the g tables just above. Advantageously, an offset, called TcOffset is used to refine the determination of $tc'_Y$ which becomes:

$$tc'_Y=Tc\text{Table}[QP_Y+Tc\text{Offset}]$$

For the chroma components, the equations would be:

$$tc'_{Cb}=Tc\text{Table}[QP_Y+Tc\text{Offset}+QP\text{offset}_{Cb}]$$

$$tc'_{Cr}=Tc\text{Table}[QP_Y+Tc\text{Offset}+QP\text{offset}_{Cr}]$$

Offset values TcOffset, $QP\text{offset}_{Cb}$, and $QP\text{offset}_{Cr}$ are typically signalled, directly or indirectly, by the encoder to the decoder in the bitstream.

By differentiating the determination of the clipping parameter for each component, it is possible to take into account the observed differences in behaviour of these components regarding the deblocking.

In some embodiments, the variables $R_{Cb}$, $R_{Cr}$ have the same value $R_{Chroma}$, as well as $N_{Cb}$, and $N_{Cr}$, which have a value $N_{Chroma}$, $g_{Cb}$ and $g_{Cr}$ may be the same or still differ.

The shift values $N_Y$, $N_{Cb}$, $N_{Cr}$, or $N_{Chroma}$ can be defined based on size considerations, whether of the g tables, or on the size of the operands to multiplications. tc' is typically coded on five to sixteen bits, as well as the values of the g tables. A sixteen by sixteen multiplication is costly. The choice of shifting parameter values allow the reduction of the multiplication to a five bits by five bits multiplication. Possible values for the R parameter are $2^{N-1}$, and 0, leading to the shift operation corresponding to a round to nearest interger operation or respectively to a truncation.

We have seen that in embodiments, the clipping parameter may be computed based on the equation:

$$tc=(tc'*g(\text{BitDepth})+R)>>N$$

Which may be rewritten as:

$$tc=(Tc\text{Table}[QP+Tc\text{Offset}]*g(\text{BitDepth})+R)>>N$$

in order to render TcOffset visible.

This embodiment gives the encoder a way to adapt the clipping parameter using the TcOffset parameter. While, this adaptation is useful, it is limited to values in TcTable as TcOffset only allows modifying the index used in the TcTable. A finer adaptation possibility may be given by introducing a scale parameter to be applied to the g table.

According to an embodiment the computation of the clipping parameter becomes:

$$tc=(Tc\text{Table}[QP+Tc\text{Offset}]*(g(\text{BitDepth})+\text{ScaleOffset})+R)>>N$$

The scale offset is a signed integer coded, for example, using the signed Exponential Golomb codes defined as se(v) by the HEVC standard as follows:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| k | $(-1)^{k+1}$ Ceil(k ÷ 2) |

The scale offset is typically signalled in the bitstream, for example at the SPS, PPS or slice level, similarly to the TcOffset.

In other embodiments, the scale function g may be replaced by a scale parameter TcScale that is explicitly signalled in the bitstream by the encoder. This signalling may be done at the SPS, PPS or slice level for example. Advantageously, this scale parameter is defined by the encoder, and signalled in bitstreams generated according to the present invention, for use by compatible decoders, at least, based on the bitdepth of the pixels of the corresponding component. The computation of the clipping parameter tc may be done according to:

$$tc=(Tc\text{Table}[QP+Tc\text{Offset}]*Tc\text{Scale}+R)>>N$$

In some embodiments, the two offset parameters, typically the parameter TcOffset and the parameter ScaleOffset or TcScale, are not signalled at the same level. One may be signalled at the SPS or PPS level, while the other one is signalled at the slice level, for example.

In some embodiments, the scale offset, or scale parameter, replaces the parameter TcOffset. In these embodiments, the parameter TcOffset is not signalled or assumed to be 0. The computation becomes one of the followings:

$$tc=(TcTable[QP]*(g(BitDepth)+ScaleOffset)+R)>>N$$

or $$tc=(TcTable[QP]*TcScale+R)>>N.$$

In some embodiments, the scale offset, or the scale parameter, may be adapted by component. The computation of the clipping parameter tc may become:

$$tc_Y=(tC'_Y*(g_Y(BitDepthY)+ScaleOffset_Y)+R_Y)>>N_Y,$$

$$tc_{Cb}=(tC'_{Cb}*(g_{Cb}(BitDepth_{Chroma})+ScaleOffset_{Cb})+R_{Cb})>>N_{Cb},$$

$$tc_{Cr}=(tC'_{Cr}*(g_{Cr}(BitDepth_{Chroma})+ScaleOffset_{Cr})+R_{Cr})>>N_{Cr};$$

It is to be noted that the adaptation of the scale offset to the component is independent from the adaptation of the scale function g itself to the component. For example, the computation of the clipping parameter tc may be, in some embodiments:

$$tc_Y=(tc'_Y*(g(BitDepthY)+ScaleOffset_Y)+R)>>N,$$

$$tc_{Cb}=(tc'_{Cb}*(g(BitDepth_{Chroma})+ScaleOffset_{Cb})+R)>>N,$$

$$tc_{Cr}=(tc'_{Cr}*(g(BitDepth_{Chroma})+ScaleOffset_{Cr})+R)>>N;$$

The person skilled in the art understands that the different embodiments may be combined and different level of adaptation can be adopted.

In some embodiments, different tables TcTable may be used for adaptation. These tables may be implicitly signalled, for example by assigning a table to a component. A table is dedicated to luma, one for chroma, or one for each chroma component.

In some embodiments, different tables may be implicitly linked to the type of image, meaning one table for image of type I, intra coded, one table for image of type P, predicted, and one table for image of type B, bidirectional. This may apply to the TcTable or the scale table g.

In some embodiments, different tables may be implicitly linked to the activation of features or tools, in particular the aforementioned Adaptive Loop filter.

In some embodiments, a set of different tables may be predefined. The table to be used, for luma and/or for chroma, is signalled in the bitstream as an index indicating the table in the set. This index may be coded as a fixed-length code, for example three bits if the number of table is eight. This index may also be coded using an unsigned Exponential Golomb code where a value 0 has the shortest code.

In some embodiments, no offsets are transmitted, neither TcOffset nor ScaleOffset. There is no scale function g either. The adaptation by component is simply done by defining different TcTables, one for each component, or, at least, one for luma and one for chroma. The computation of the clipping parameter tc may become in an example:

$$tc_Y=(TcTable_Y[QP_Y]<<(BitDepthY-8))$$

$$tc_{Cb}=(TcTable_{Cb}[QP_{Cb}]<<(BitDepth_{Cb}-8))$$

$$tc_{Cr}=(TcTable_{Cr}[QP_{Cr}]<<(BitDepth_{Cr}-8))$$

In an embodiment, the two chroma tables $TcTable_{Cb}$ and $TcTable_{Cr}$ may be the same, represented by a single $TcTable_{Chroma}$.

Figure 4:
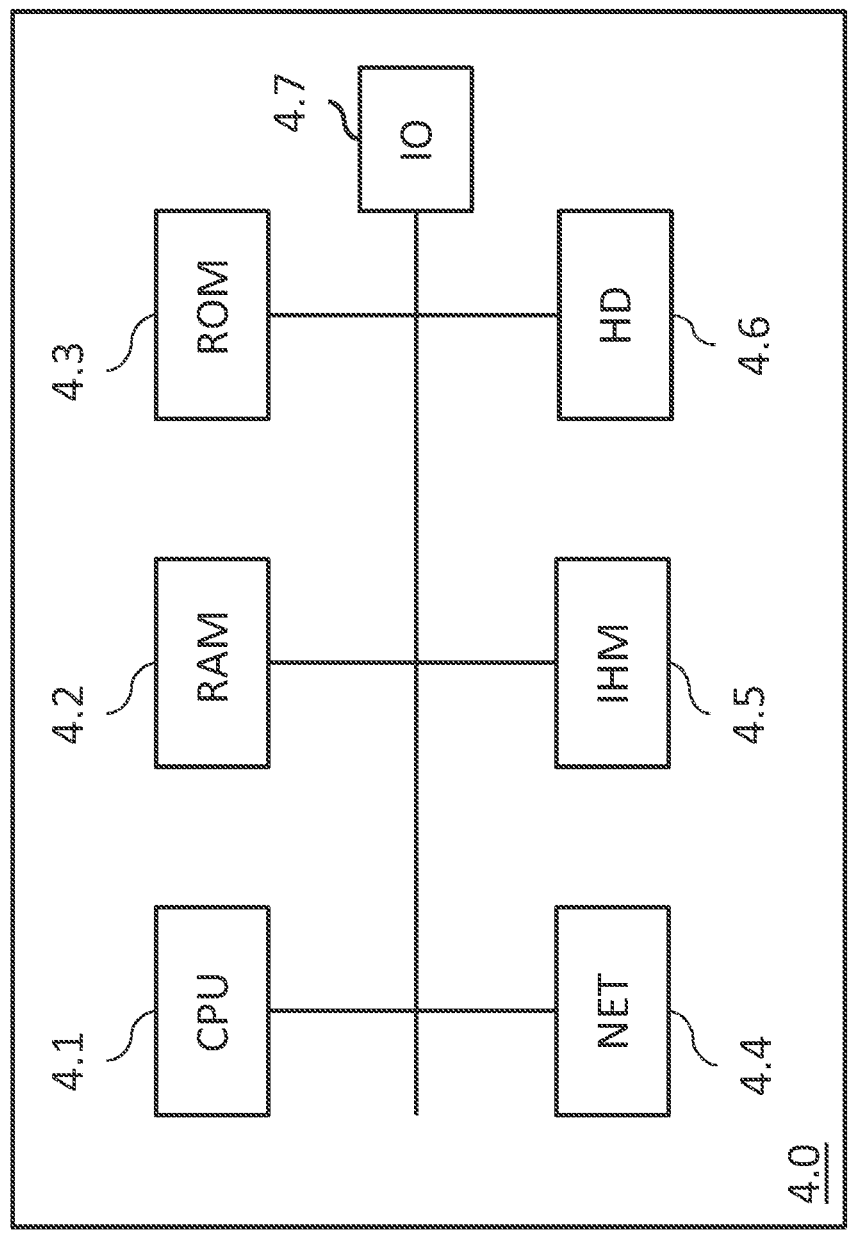
FIG. 4 is a schematic block diagram of a computing device for implementation of one or more embodiments of the invention.

FIG. 4 is a schematic block diagram of a computing device 4.0 for implementation of one or more embodiments of the invention. The computing device 4.0 may be a device such as a micro-computer, a workstation or a light portable device. The computing device 4.0 comprises a communication bus connected to:
- a central processing unit 4.1, such as a microprocessor, denoted CPU;
- a random access memory 4.2, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;
- a read only memory 4.3, denoted ROM, for storing computer programs for implementing embodiments of the invention;
- a network interface 4.4 is typically connected to a communication network over which digital data to be processed are transmitted or received. The network interface 4.4 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 4.1;
- a user interface 4.5 may be used for receiving inputs from a user or to display information to a user;
- a hard disk 4.6 denoted HD may be provided as a mass storage device;
- an I/O module 4.7 may be used for receiving/sending data from/to external devices such as a video source or display.

The executable code may be stored either in read only memory 4.3, on the hard disk 4.6 or on a removable digital medium such as for example a disk. According to a variant, the executable code of the programs can be received by means of a communication network, via the network interface 4.4, in order to be stored in one of the storage means of the communication device 4.0, such as the hard disk 4.6, before being executed.

The central processing unit 4.1 is adapted to control and direct the execution of the instructions or portions of software code of the program or programs according to embodiments of the invention, which instructions are stored in one of the aforementioned storage means. After powering on, the CPU 4.1 is capable of executing instructions from main RAM memory 4.2 relating to a software application after those instructions have been loaded from the program ROM 4.3 or the hard-disc (HD) 4.6 for example. Such a software application, when executed by the CPU 4.1, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of deblocking filtering for an image, the method comprising:
    obtaining a first parameter value for deblocking filtering based on a second parameter value; and
    obtaining a filtered sample value by performing deblocking filtering on a sample in a block of samples by using the first parameter value, the filtered sample value being limited by a range based on the first parameter value,
    wherein obtaining the first parameter value comprises:
    obtaining the second parameter value based on a quantization parameter value for the block of samples; and
    obtaining the first parameter value by adding an offset to the second parameter value, obtaining a value N using a parameter value indicating a bit-depth of the image, and bit-shifting a result of the adding to right by N bits, wherein N is a positive integer in a case where the bit-depth of the image is 8.

2. The method according to claim 1, wherein the offset varies according to the bit-depth of the image.

3. The method according to claim 1, wherein the second parameter value is obtained from a table associating the value with the quantization parameter value.

4. An apparatus for deblocking filtering for an image, the apparatus comprising:
    an obtaining unit configured to obtain a first parameter value for deblocking filtering; and
    a filtering unit configured to obtain a filtered sample value by performing deblocking filtering based on a second parameter value on a sample in a block of samples by using the first parameter value, the filtered sample value being limited by a range based on the first parameter value,
    wherein the obtaining unit is configured to obtain the second parameter value based on a quantization parameter value for the block of samples, and to obtain the first parameter value by adding an offset to the second parameter value, obtaining a value N using a parameter value indicating a bit-depth of the image, and bit-shifting a result of the adding to right by N bits, wherein N is a positive integer in a case where the bit-depth of the image is 8.

5. The apparatus according to claim 4, wherein the offset varies according to the bit-depth of the image.

6. The apparatus according to claim 4, wherein the second parameter value is obtained from a table associating the value with the quantization parameter value.

* * * * *